April 12, 1927.
T. H. McQUINN
1,624,843
ELECTRIC WATER HEATER
Filed April 27, 1925
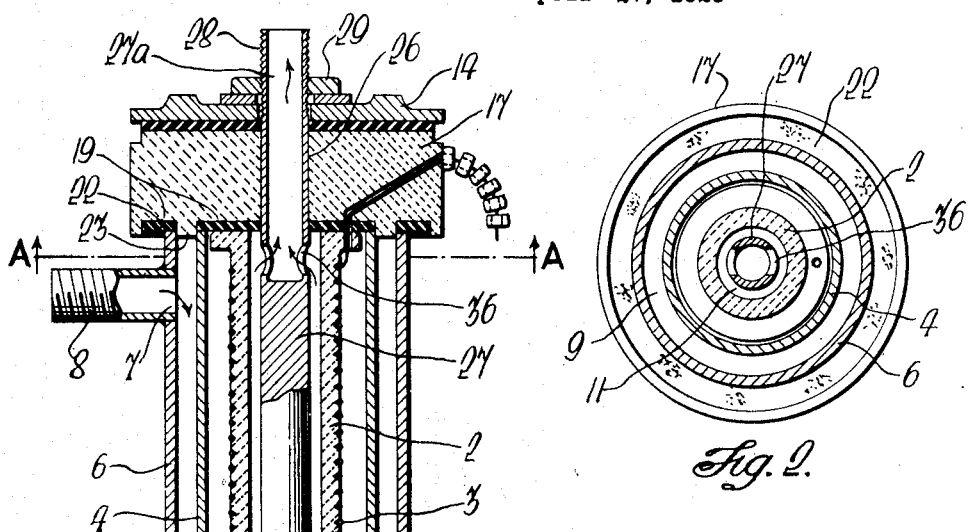
Inventor
T. H. McQuinn Patented Apr. 12, 1927.

1,624,843

UNITED STATES PATENT OFFICE.

THOMAS HORACE McQUINN, OF PRESTON, MELBOURNE, VICTORIA, AUSTRALIA, ASSIGNOR OF TWO-THIRDS TO HARRY MORTON SARGOOD, OF TOORAK, VICTORIA, AUSTRALIA.

ELECTRIC WATER HEATER.

Application filed April 27, 1925, Serial No. 26,235, and in Great Britain June 10, 1924.

This invention relates to electric water-heaters and it has for its main object to provide a heater which is capable of furnishing a continuous supply of hot water suitable for baths and like domestic and other purposes where a running supply of hot water is desirable.

A further object of the invention is to provide a water heater comprising a hollow heating element which is arranged within an outer casing or casings of different diameters to thereby provide a water circulating passage having one branch extending longitudinally through the heating element and one or more interconnected passages surrounding said heating element, the said branch passages being of relatively small area in cross section whilst the heating surfaces of the heating element are relatively large. By this arrangement it is ensured that all the heat will be absorbed by the water, resulting in a maximum thermal efficiency and a practically instantaneous flow of hot water.

According to the invention the improved heater comprises a tube or tubular element composed of a material which is heat refractory and a non-conductor of electricity, the said tube being wound, or otherwise suitably covered externally, with a conducting wire or other form of electric resistance along which current may be passed from any suitable source of supply. The heating tube is preferably disposed concentrically within two or more cylindrical casings of different diameters, the various parts being suitably connected at their ends so that the internal passage of the heating tube and the longitudinally extending annular space between the cylindrical casings communicate with each other at their ends and provide a continuous water circulating passage through which the water to be heated flows and wherein it is continually subjected to the action of the heating tube.

In some instances, in order to reduce the length of the tubular heating element necessary to obtain the results required, I may make use of two or more heating tubes of different diameters which may be fitted concentrically one within the other and each of them covered or externally wound with a resistance wire for the passage of the electric current. Cylindrical casings of various diameters are arranged concentrically between and around said heating tubes so as to form a continuous water circulating passage which extends within, between and around the heating tubes.

Referring to the drawings which form part of this specification:—

Figure 1 is a longitudinal section of an electric water heater according to one constructional embodiment of the invention.

Figure 2 is a cross sectional view on the line A—A of Figure 1.

Figure 3 is an end view of the heater seen in Figure 1.

Figure 4 is a cross section on the line B—B of Figure 1.

In the accompanying drawings the numeral 2 is employed to indicate generally the heating tube or tubular element composed of silica or other substance which is heat refractory and a non-conductor of electricity and through which the water to be heated passes and 3 the resistance or conducting wire which is preferably helically wound around the exterior of the said tube, for the passage of the heating current. Each heating tube may be provided externally with a spiral groove to form a seating for the resistance wire 3.

In the embodiment shown in Figures 1 to 4 a single heating tube 2 is arranged concentrically within inner and outer cylindrical casings 4 and 6 of equal length, the outer casing 6 being provided with an inlet opening 7 from which a nipple 8 may outstand. The longitudinally extending annular space 9 formed between the two casings 4 and 6 constitutes a first or initial passage for the water to be heated. End fittings are provided to retain the heating tube 2 and the casings 4 and 6 in proper relative position, so that no leakage of water is possible, and one of these end fittings is adapted to afford communication between the aforesaid annular space or initial water heating passage 9 and the internal passage 11 of the heating tube as hereinafter described.

The end fittings may each comprise outer sections or caps 13 and 14 of metal or the like, and inner sections 16 and 17 which may be composed of a suitable heat refractory material and have their inner faces recessed as at 18 and 19 to furnish seatings for jointing rings or washers 21 and 22. These recessed faces also provide circular lips 23 against the inner and outer peripheries of which, the respective end portions of the casings 4 and 6 bear.

Longitudinal apertures 26 are formed centrally through said inner sections of the end fittings to accommodate a rod 27 which extends centrally through the interior of the heating tube 2. The aforesaid outer section or cap 13 is fixedly attached to one end of the longitudinal rod the other end of which is screw threaded as at 28 and projects through the cap 14 at the adjacent end of the heater. The last mentioned end portion of the rod 27 is preferably of tubular formation for a purpose hereinafter mentioned. A nut 29 is provided on the screw threaded end of the rod 27 whereby the end fittings may be contracted or drawn together, so that the respective ends of the heating tube 2 and the casings 4 and 6 are forced into leak proof engagement with the jointing rings or washers 21 and 22. Similar jointing rings or washers may be interposed between the respective inner sections 16 and 17 and their caps 13 and 14.

The inner section or cap 16 may have a number of longitudinal ports or passages 31 formed therein in order to establish communication between the aforesaid annular space or passage 9 and a chamber 32 which is formed between the said inner section 16 and its cap 13.

The portion of the longitudinal rod 27 accommodated within the inner section 16 is reduced in cross sectional area, preferably by the formation of flats 33 around its periphery to thereby permit the water to pass between the rod 27 and the aperture 26 in the inner section 16, into the internal passageway 11 of the heating tube. The opposite end portion of the longitudinal rod 27 is preferably of tubular formation as at 27ª and communication may be established between the interior 11 of the heating tube and the said tubular portion 27ª by way of orifices 36 formed in said rod adjacent the inner extremity of the tubular portion thereof. The tubular portion 27ª which is externally threaded as aforesaid, thus serves as a nipple to which a hot water delivery pipe or the like may be connected. The opposite end portions of the resistance wire 3 may pass through apertures formed in the inner sections 16 and 17 of the end fittings and are provided with, or led to, suitable terminals (not shown).

In operation the water enters the heater through the opening 7 in the outer casing 6 and flows along the annular space 9 through the ports 31 in the inner section 16 of the appropriate end fitting into the chamber 32, and thence through the passage between the reduced portion of the longitudinal rod 27 and the aperture 26 in the section 16 into the internal passage 11 of the heating tube, and finally by way of the orifices 36 into the tubular portion of the rod 27 from which it may be drawn off as required.

During its passage through the heater the water is continuously heated and owing to the relatively large heating surfaces provided by the heating tube and the surrounding casings 4 and 6 and the relatively small cross sectional area of the water circulating passage 9 and 11 a high rate of thermal efficiency is obtained.

Having now described my invention what I claim as new and desire to secure by Letters Patent is:

1. An electric water heater including opposing fittings, a rod connecting said fittings, a tubular element surrounding and spaced from the rod and forming therewith a water passage, an electric resistance element wound directly upon the tubular element, a casing surrounding the tubular element and spaced therefrom, the fittings closing the space between said tubular element and casing against the passage of water, and a second casing surrounding and spaced from the first mentioned casing to define a water passage between said casings.

2. An electric water heater comprising a tubular heating element adapted for the passage of liquid therethrough, an electric resistance on the exterior of said element, cylindrical casings arranged around and spaced from said heating element to form an annular water circulating passage which surrounds and is isolated from said electric resistance, end fittings adapted to close the ends of said cylindrical casings and establish communication between adjacent ends of said annular passage and the internal passage through the tubular heating element, a rod extending longitudinally of the heating element, and means associated with said rod to retain the heating element and said casings in proper spaced relationship and in leak proof engagement with said end fittings for the purpose set forth.

3. An electric water heater comprising a tubular heating element adapted for the passage of liquid therethrough, an electric resistance wound upon the exterior of said tubular element, cylindrical casings arranged concentrically around said heating element to thereby form an annular water circulating passage which surrounds and is isolated from said electric resistance, end fittings adapted to close the ends of said cylindrical casings, one of said end fittings having longitudinal ports or passages therethrough to establish communication between adjacent ends of said annular passage and the internal passage through the heating element, and means for clamping said heating element and casings in proper concentric relationship between said end fittings.

4. An electric water heater comprising in combination a tubular heating element adapted for the passage of liquid therethrough, an electric resistance wound on the exterior of said tubular element, cylindrical casings arranged concentrically and in spaced relationship around said heating element to thereby form an annular water circulating passage which surrounds and is isolated from said electric resistance, end fittings adapted to close the ends of said cylindrical casings, a cap member attached to one of said end fittings, said cap member forming a chamber which communicates with the adjacent ends of said annular passage and the interior of the heating element by way of ports or passages formed through the respective end fitting, and a screw threaded rod extending longitudinally of the heating element and adapted to secure said end fittings in leak proof engagement against the ends of said tubular heating element and said casings.

5. An electric water heater comprising a tubular heating element of heat refractory material adapted for the passage of liquid therethrough, an electric resistance on the exterior of said element, cylindrical casings arranged around said heating element to thereby form an annular water circulating passage which surrounds and is isolated from said electric resistance, end fittings adapted to close the ends of said cylindrical casings, one of said end fittings having ports or passages to establish communication between adjacent ends of said annular passage and the internal passage of the heating element, flexible jointing rings seated on the inner faces of said end fittings and adapted to form water tight joints between said fittings and the ends of said casings, and means for drawing said jointing rings against the ends of said casings.

6. An electric water heater comprising a tubular heating element adapted for the passage of liquid therethrough, an electric resistance mounted on the exterior of said element, cylindrical casings arranged around said heating element to thereby form an annular water circulating passage which surrounds and is isolated from said electric resistance, end fittings adapted to close the ends of said casings, one of said end fittings having ports or passages therein to establish communication between adjacent ends of said annular passage and the internal passage of the heating element, a rod extending longitudinally and centrally through the tubular heating element, said rod having a hollow end portion in communication with said internal passage of the heating element whereby the heated liquid is delivered from the heater, and means associated with said rod whereby said end fittings may be drawn into leak proof engagement with the adjacent ends of said heating element and casings.

In testimony whereof I affix my signature.

THOS. H. McQUINN.